(12) United States Patent
Yechieli

(10) Patent No.: US 10,170,921 B2
(45) Date of Patent: Jan. 1, 2019

(54) METHODS AND SYSTEMS FOR EFFICIENT BATTERY CHARGING AND USAGE

(71) Applicant: PowerPlug Ltd., Tel Aviv (IL)

(72) Inventor: Eyal Yechieli, Tel Aviv (IL)

(73) Assignee: POWERPLUG LTD., Tel Aviv (IL)

( * ) Notice: Subject to any disclaimer, the term of this patent is extended or adjusted under 35 U.S.C. 154(b) by 360 days.

(21) Appl. No.: 14/951,592

(22) Filed: Nov. 25, 2015

(65) Prior Publication Data

US 2016/0079787 A1 Mar. 17, 2016

Related U.S. Application Data

(63) Continuation-in-part of application No. 13/570,310, filed on Aug. 9, 2012, now Pat. No. 9,201,478.

(60) Provisional application No. 61/522,396, filed on Aug. 11, 2011.

(51) Int. Cl.
| | |
|---|---|
| *H02J 7/00* | (2006.01) |
| *G06F 1/26* | (2006.01) |
| *H02J 3/14* | (2006.01) |
| *H02J 7/02* | (2016.01) |

(52) U.S. Cl.
CPC .............. *H02J 7/0052* (2013.01); *G06F 1/26* (2013.01); *H02J 3/14* (2013.01); *H02J 7/02* (2013.01); *H02J 2003/146* (2013.01); *Y02B 40/90* (2013.01); *Y02B 70/3225* (2013.01); *Y04S 20/222* (2013.01); *Y04S 20/224* (2013.01)

(58) Field of Classification Search
CPC .. G06F 1/26; G06F 1/3212; H02J 7/02; H02J 3/14; H02J 2003/146; Y02B 40/90; Y02B 70/3225; Y04S 20/224; Y04S 20/222

USPC .......................................................... 320/107
See application file for complete search history.

(56) References Cited

U.S. PATENT DOCUMENTS

| | | | |
|---|---|---|---|
| 7,135,956 B2 | 11/2006 | Bartone et al. | |
| 8,358,103 B2 * | 1/2013 | Eastlack | H02J 7/025 320/108 |
| 8,872,379 B2 | 10/2014 | Ruiz et al. | |
| 2003/0009705 A1 | 1/2003 | Thelander et al. | |
| 2008/0209247 A1 | 8/2008 | Thelander et al. | |
| 2009/0172163 A1 | 7/2009 | Carroll et al. | |

(Continued)

FOREIGN PATENT DOCUMENTS

| | | | | |
|---|---|---|---|---|
| WO | WO 2010/042550 A2 | 4/2010 | | |
| WO | WO 2010042550 A2 * | 4/2010 | ............... | H02J 3/32 |

*Primary Examiner* — Jack Chiang
*Assistant Examiner* — Brandon Bowers
(74) *Attorney, Agent, or Firm* — Finnegan, Henderson, Farabow, Garrett & Dunner, LLP

(57) ABSTRACT

Battery charging methods and systems for devices that have rechargeable batteries provide an efficient way to know when to charge a device's battery, and when to switch between the device's battery and an external power source as the device's power source. The methods and systems receive signals associated with an external information service including instructions to conduct processing, access thresholds for a plurality of power rates, obtain information about when different power rates are in effect and, after determining a charge level associated with a battery, compare the threshold of the current power rate to the device's battery's charge level. Based on such a comparison, the methods and systems can determine whether the battery should be charged and whether the device's battery or an external power source should be used as the device's power source.

20 Claims, 10 Drawing Sheets

(56) References Cited

U.S. PATENT DOCUMENTS

| | | |
|---|---|---|
| 2009/0228725 A1 | 9/2009 | Carroll |
| 2009/0313034 A1* | 12/2009 | Ferro .................. B60L 8/003 705/1.1 |
| 2010/0017045 A1* | 1/2010 | Nesler ................ B60L 11/1824 700/296 |
| 2010/0131785 A1 | 5/2010 | Blackburn et al. |
| 2011/0054846 A1 | 3/2011 | Karayi et al. |
| 2011/0055609 A1 | 3/2011 | Karayi et al. |
| 2011/0093588 A1 | 4/2011 | Karayi et al. |
| 2011/0161707 A1 | 6/2011 | Blackburn et al. |
| 2011/0175569 A1* | 7/2011 | Austin ................ B60L 11/1824 320/109 |
| 2011/0204720 A1* | 8/2011 | Ruiz .................. B60L 11/1816 307/66 |
| 2012/0005126 A1* | 1/2012 | Oh ........................ G06Q 50/06 705/412 |
| 2012/0229077 A1* | 9/2012 | Tsuchiya .................. H02J 3/32 320/107 |
| 2012/0286574 A1* | 11/2012 | Sawada .................... H02J 7/35 307/23 |

\* cited by examiner

METHODS AND SYSTEMS FOR EFFICIENT BATTERY CHARGING AND USAGE

CROSS-REFERENCE TO RELATED APPLICATIONS

This application claims the benefit of U.S. patent application Ser. No. 13/570,310, filed Aug. 9, 2012, and U.S. Provisional Application No. 61/522,396 filed Aug. 11, 2011, the contents of which are incorporated herein by reference in their entirety.

FIELD OF THE INVENTION

This application is directed towards methods and systems for battery charging and power source switching of battery-attached devices.

BACKGROUND OF THE INVENTION

Reducing the consumption of power in electrical systems is desirable for many reasons. For instance, electrical power can be expensive, and the cost is often charged based on the quantity used. Further, the total available power in an electrical system may be limited. Thus, reducing the power consumption of devices connected to an electrical system such as a power grid can reduce the strains on the electrical system and allow for more devices to operate on the system, or allow for other devices connected to the system to operate with higher power consumptions.

SUMMARY

In accordance with one embodiment, as broadly described herein, a method of charging a battery associated with a portable device is disclosed. The device is configured to draw power from either one of a battery or an external power source. In accordance with this method, a signal is received from an external information service, the signal including power rate data reflecting a value at which power is purchasable at a particular time. The method also includes determining a usage threshold and a charge threshold corresponding to the power rate data in response to receiving the signal. The method also includes enabling the device to draw power from the battery as a function of whether a charge level associated with the battery exceeds the usage threshold, and enabling the device to charge the battery with power drawn from the external power source as a function of whether the charge level is below the charge threshold and whether the external power source is available.

In accordance with another embodiment, as broadly described herein, a system for charging a battery associated with a portable device is disclosed. The device is configured to draw power from either one of a battery or an external power source. The system comprises one or more processors, one or more memories, and instructions stored on the one or more memories, which, when executed by the processor, cause the system to perform one or more operations. The operations include receiving a signal from an external information service, the signal including power rate data reflecting a value at which power is purchasable at a particular time. The operations also include determining a usage threshold and a charge threshold corresponding to the power rate data in response to receiving the signal. The operations also include enabling the device to draw power from the battery as a function of whether a charge level associated with the battery exceeds the usage threshold, and enabling the device to charge the battery with power drawn from the external power source as a function of whether the charge level is below the charge threshold and whether the external power source is available.

In accordance with another embodiment, as broadly described herein, a tangible, non-transitory computer-readable medium for charging a battery of a device is disclosed. The device is configured to draw power from either one of a battery or an external power source. The non-transitory computer-readable medium stores instructions that, when executed by at least one processor, cause the at least one processor to perform a method. The method includes receiving a signal from an external information service, the signal including power rate data reflecting a value at which power is purchasable at a particular time. The method also includes determining a usage threshold and a charge threshold corresponding to the power rate data in response to receiving the signal. The method also includes enabling the device to draw power from the battery as a function of whether a charge level associated with the battery exceeds the usage threshold, and enabling the device to charge the battery with power drawn from the external power source as a function of whether the charge level is below the charge threshold and whether the external power source is available.

Additional aspects related to the embodiments will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Figure 1:
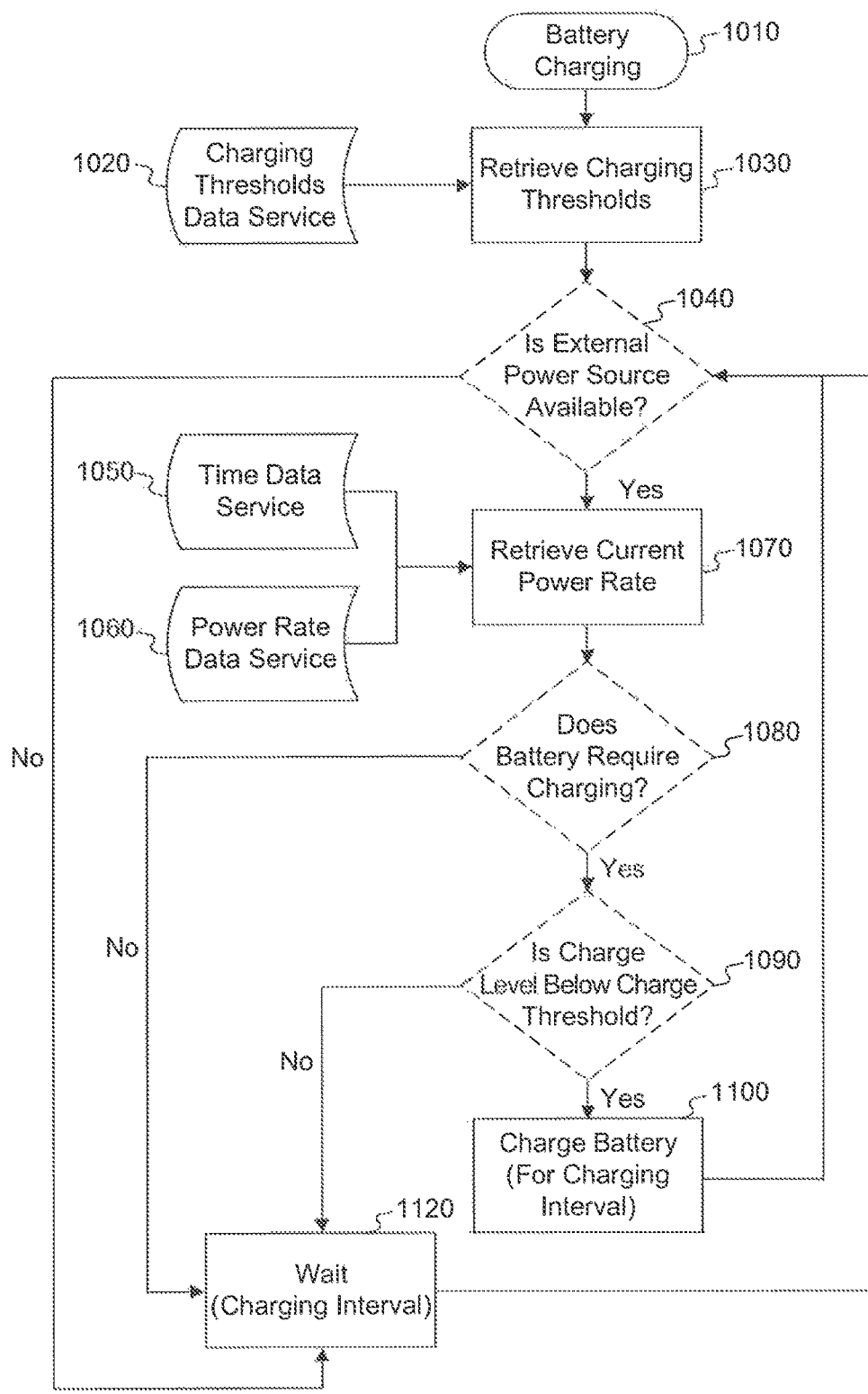
FIG. 1 is a flow chart of a battery charging method according to one embodiment.

Reference will now be made in detail to the present embodiments (exemplary embodiments) of the invention, examples of which are illustrated in the accompanying drawings. Wherever possible, the same reference numbers will be used throughout the drawings to refer to the same or like parts.

When a device can use both a battery and an external power source, benefits may be obtained by optimizing the utilization of the battery and the external power source. For instance, in some embodiments, the battery of the device may be charged using the external power source if certain conditions are met. Further, in some embodiments, the power source of the device may be switched between the battery and the external power source if certain other conditions are met. In some embodiments, both battery charging and power-source switching may be implemented.

The conditions for performing battery charging and power source switching may be based on, for example, the charge level of the battery, time data, power rate data, charging thresholds associated with the power rate data, or combinations thereof. The charge level of the battery may provide an indication of how much charge remains on the battery. The time data may include information about the current time. The power rate data may include information about when a variety of power rates or potential power rates representative of the cost or availability of power are in effect. For example, power rate data may provide one or more values, each value representing cost, availability, or a combination thereof, of power at a particular time. In addition, in some embodiments, power rate data may also include information regarding user habits. For example, user habit information may indicate the times that a user typically connects a device to external power. The time data and power rate data may be used to determine a current power rate, with the current power rate corresponding to a given charging threshold. For example, if the cost of power is relatively low during the day and relatively high at night, and the user typically always has the device connected to external power, then a low power rate may be assigned during the day and a high power rate may be assigned at night. In contrast, for example, if the cost of power is relatively low during the day and relatively high at night, but the user typically only connects the device to external power at night, then a low power rate may be assigned at night. In some aspects, the habit information may reflect energy-usage patterns or power consumption profiles associated with the device. For example, the habit information may include energy distributions representing times or rates at which the device consumes varying degrees of power, the device is connected to an external power source, the device is idle or powered-down, the device is connected to particular network types (e.g., 3G, LTE, WiFi, etc.), the device performs background downloads, or any other energy-consumption measure. In some aspects, the habit information may also be used to generate or influence charging thresholds in a similar manner (e.g., increasing charging thresholds during more active times and/or decreasing charging thresholds during less active times).

In some embodiments, a comparison may be performed between the charge level of the battery and the charging threshold associated with the current power rate to determine whether to charge the battery. In some embodiments, a comparison may be performed between the charge level of the battery and the charging threshold(s) associated with the current power rate to determine whether to supply power to the device using the battery or the external power source.

Figure 4:
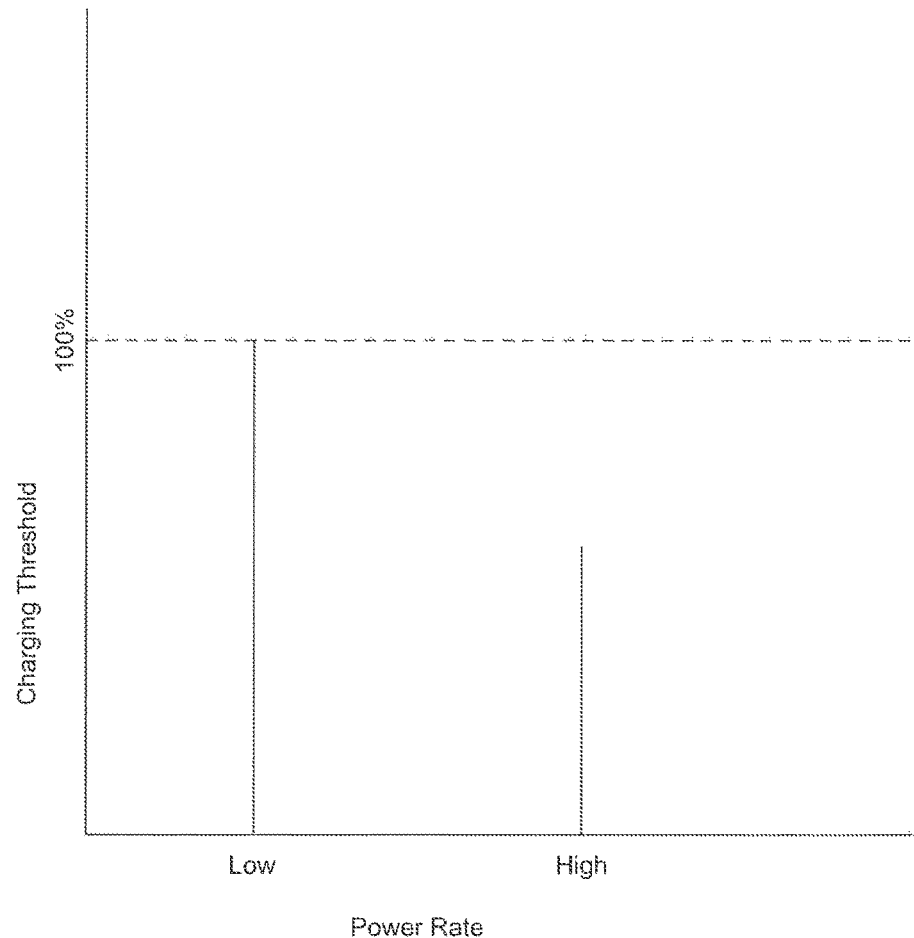
FIG. 4 is a chart that provides an example of the correspondence between two power rates and two respective charging thresholds.
Figure 5:
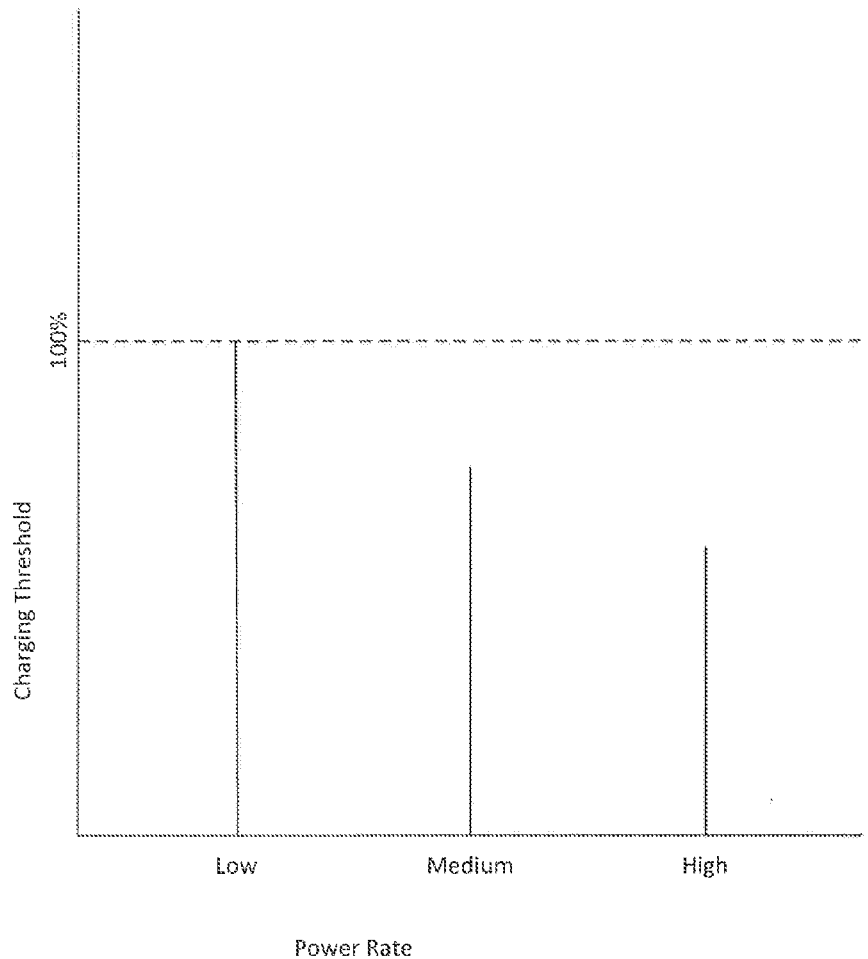
FIG. 5 is a chart that provides an example of the correspondence between three power rates and three respective charging thresholds.
Figure 6:
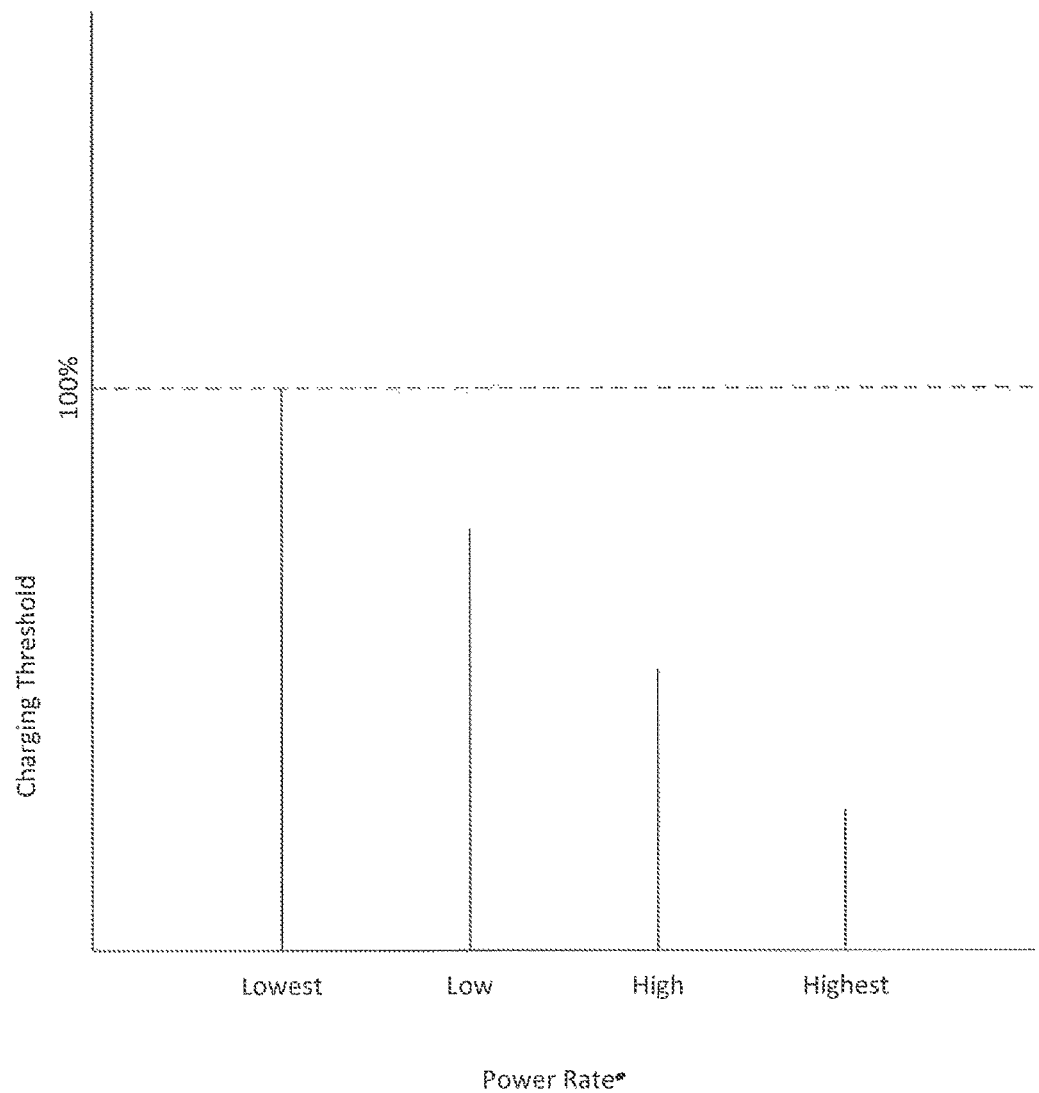
FIG. 6 is a chart that provides an example of the correspondence between four power rates and four respective charging thresholds.

FIG. 1 depicts a method of charging a battery of a device according to power rate. The method begins by retrieving a set of charging thresholds from a charging thresholds data service 1020 (step 1030). In some aspects, each charging threshold in the set corresponds with a given power rate. For example, as shown in FIG. 5, there could be three different power rates: High, Medium, and Low, whereby each power rate would have a different corresponding charging threshold. However, any number of power rates greater than or equal to 2 could also be utilized. For example, FIG. 4 illustrates how a system could utilize two power rates, and FIG. 6 illustrates how a system could utilize four power rates. Generally, there is an inverse relationship between power rate and charging threshold, such that higher power rates correspond with lower charging thresholds.

A charging threshold generally refers to the battery charging level. A charging threshold can refer to the maximum battery charging level that should be reached when the power rate is in effect. For example, if the charging threshold for the "Medium" rate is set to 50%, the battery should be charged up to 50% when this rate is in effect. In some aspects, this type of charging threshold may be referred to as a charge threshold, indicating that the charge level of the battery should not exceed this amount for a given power rate. The charging threshold of the lowest rate is set to be higher than the other power rates, and can be, for example, at or near 100%.

Additionally, a charging threshold can also refer to the minimum battery level that should be reached when the power rate is in effect and the device is connected to an external power source. For example, if the charging threshold for the "Medium" rate is set to 50%, the device can draw power from the battery until the battery is 50% charged instead of taking the power from an external source. This type of charging threshold may be referred to as a usage threshold, indicating that the device will use power from the battery until it reaches this charge level. Below this level, the device will draw power from an available external power source, which may or may not charge the battery, as described below.

A given power rate may be associated with a set of thresholds including a usage threshold and/or a charge threshold. As described above, a usage threshold reflects a minimum battery level in which a device draws power from the battery, and a charge threshold reflects a maximum battery level to which the device charges the battery from power drawn from an external source. In some aspects, a usage threshold and a charge threshold may be equal and/or assimilated into a single threshold (e.g., the system charges the battery when its charge level falls below the threshold, and draws power from it above the threshold). Alternatively, a usage threshold and a charge threshold for a given power rate need not be equal. For example, a usage threshold for a "low" power rate may be set to 90% while the charging threshold may be set to 50%. In this example, the device will draw power from the battery during times of "low" power rates while its charge level is greater than or equal to 90%. Similarly, the device will charge the battery from external power when its charge level is equal to and/or falls below 50% as long as an external power source is available. When the battery charge level is between 50% and 90% (inclusive or exclusive), the device may draw power from available external power source but will not charge the battery with this power. Other power rates may be associated with other charge and usage thresholds. As used herein, a "charging threshold" may refer to either a usage threshold or charge threshold.

A charging threshold (e.g., a usage threshold or a charge threshold) may depend on any information consistent with the disclosed embodiments. For example, a charging threshold may included as independent data transmitted from a signal from an external information service, as described below. A charging threshold may also be based on a device class of the device, such as those described in connection with scheduling events below. A device class may reflect a category of devices having similar characteristics, such as a mobile phone, tablet, laptop computer, mobile device generally, refrigerator, freezer, sensor, television, handheld consumer device (e.g., a gaming console, remote-controlled toy, etc.), camera, vehicle, and so on. For example, a system may establish different charging thresholds for a laptop computer relative to a handheld gaming console. Charging thresholds may also be based on expected or historical power consumption profile for the device.

A charging threshold may be based on any other information consistent with the disclosed embodiments (e.g., user preferences, user-defined thresholds, user schedule information etc.). For example, a user may establish a set of charging thresholds (e.g., for a set of given power rates) as a user preference setting stored on the device. By way of illustration, a user may establish a setting associating a high power rate with a usage threshold of 50% and a charge threshold of 30%, and associating a low power rate with a usage threshold and charge threshold of 80% and 60%, respectively.

In another example, a charging threshold may be based on user schedule information reflecting planned events or activities associated with a user. In certain embodiments, user schedule information may include calendar information associated with the user, such as data from a calendar application operable on the device, data stored on an external server and retrieved over a network, calendar data stored on a database, navigational data associated with a vehicle routing application, etc. User schedule information may include both temporal and spatial components and may be compared to existing data, such as device's current location. In one example, for instance, a device or another computing system may determine that a user has a meeting scheduled outside a proximity range to her current location, indicating that a charge threshold for the disclosed embodiments should be increased (e.g., to cause the device to charge the battery more often while external power is available). Similarly, the charging thresholds may also be updated to reflect an expected or planned route a user may take to get to the meeting so that the device maintains enough charge to survive the trip. In another example, the device or another computing system may determine that a user has a three-hour meeting scheduled, and adjust the charging threshold(s) to ensure that the device has enough charge to operate for at least three hours without power from an external source.

In some aspects, the charging threshold may be based on user habit information. For example, the device may determine that a user usually drives between certain parts of the day and adjust the charging thresholds to ensure that the device has enough charge level to last the expected trip without external power (e.g., based on historical power consumption and battery depletion levels during this time). In another example, a system may determine that a user typically uses a device more often during a particular time of day, and may increase charging thresholds during this time for a particular device so that the device remains charged. In this example, the system may also decrease charging thresholds during other times (e.g., because the user expected not to use the device). In this manner, the charging thresholds may be continually adjusted according to a spatial and temporal parameters associated with a user's habits and scheduled events. These charging thresholds may be adjusted locally by the device and/or by remotely by external systems (e.g., an external information service via a signal).

After retrieving the charging thresholds, a determination is made as to whether an external power source is available (step 1040). If no external power source is available, the device is instructed to wait for a charging interval (step 1120) before returning to the determination of whether there is an external power source available (step 1040). The charging interval refers to a basic time unit for performing a charging operation. For example, a charging interval can be 15 minutes. However, different charging intervals can also be used. Charging intervals may be defined by any parameters consistent with the disclosed embodiments (e.g., current or expected charge levels, power rates, etc.), as described in further detail below.

If an external power source is available, a retrieval operation is performed to retrieve the current power rate (step 1070). To retrieve the current power rate, at least one of a time data service 1050 and a power rate data service 1060 is accessed. The time data service 1050 and power rate data service 1060 may be accessed, for example, from a local cache or a remote server. The time data service 1050 provides the current time. The power rate data service 1060 provides information on the power rates and when each power rate is in effect. For instance, during periods of high power usage or high power costs of the external power source, the power rate data service 1060 would indicate a high power rate (corresponding to a low charging threshold). Additionally, during periods of low power usage or low power costs of the external power source, the power rate data service 1060 would indicate a low power rate (corresponding to a high charging threshold). In some aspects, any of the charging, time, or power rate data services may reflect distinct or the same service (e.g., disparate or the same computing systems, such as remote computers or the device).

After obtaining the current power rate, a determination is made as to whether the device's battery requires charging (step 1080). If the battery does not require charging, the device is instructed to wait for a charging interval (step 1120) before returning to the determination of whether there is an external power source available (step 1040). However, if the battery does require charging, a determination is made as to whether the charge level of the battery is below the charge threshold (step 1090) (e.g., as defined in the charging thresholds received from the charging thresholds data service). If the charge level of the battery is not below the charge threshold, the device is instructed to wait for a charging interval (step 1120) before returning to the determination of whether there is an external power source available (step 1040). However, if the charge level of the battery is below the charge threshold, the battery is charged for a charging interval (step 1100) before returning to the determination of whether there is an external power source available (step 1040).

Figure 2:
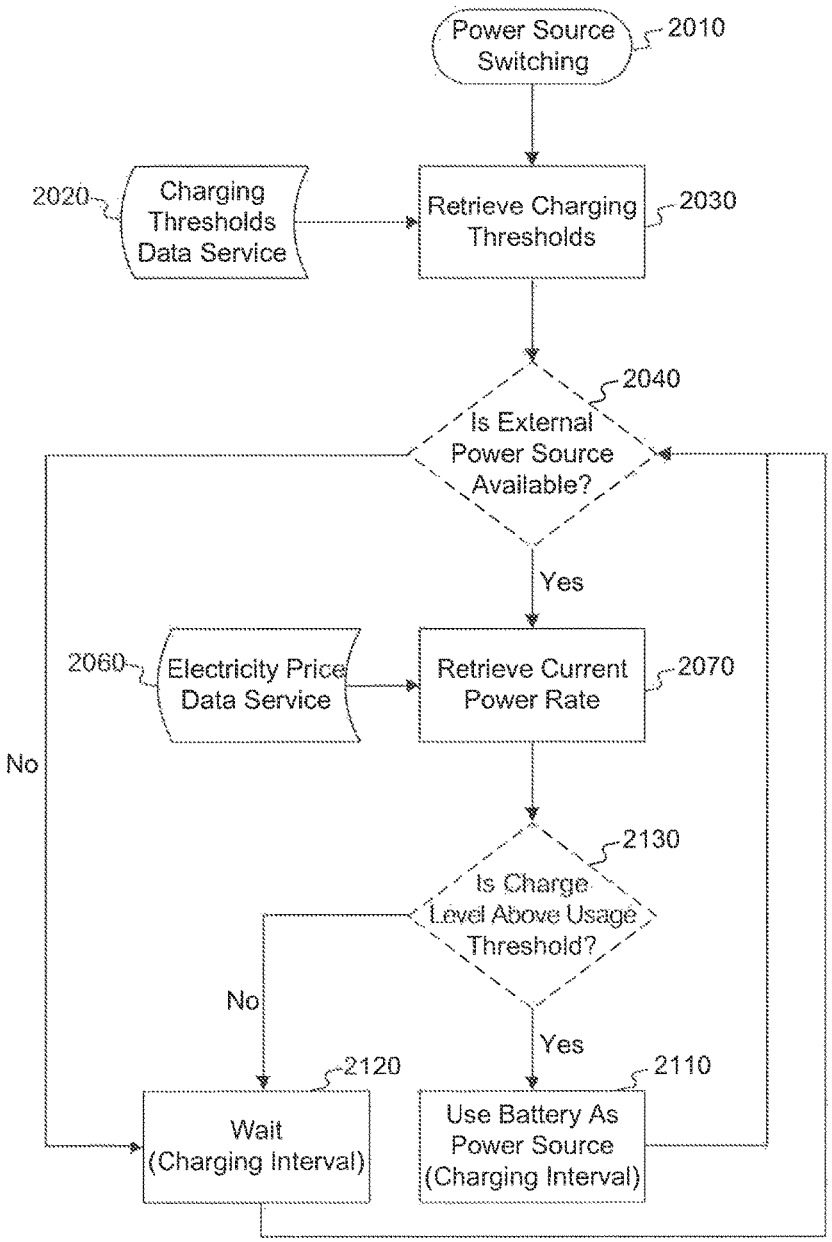
FIG. 2 is a flow chart of a power source switching method according to one embodiment.

FIG. 2 depicts a method of performing power source switching for a device according to power rate. The method begins by retrieving charging thresholds from a charging thresholds data service 2020 (step 2030) in substantially the same manner as described above with reference to FIG. 1. After retrieving the charging thresholds, a determination is made as to whether an external power source is available (step 2040). If no external power source is available, the device is instructed to wait for a charging interval (step 2120) before returning to the determination of whether there is an external power source available (step 2040).

If an external power source is available, a retrieval operation is performed to retrieve the current power rate (step 2070). In order to retrieve the current power rate, an electricity prices data service 2050 is accessed. The electricity prices data service 2050 provides for the cost of power at a particular time of day. For example, if the price of electricity is high, the power rate will be high, whereas if the price of electricity is low, the power rate will be low.

Once the current power rate is retrieved, a determination is made as to whether the charge level of the device is above the usage threshold (step 2130). If the charge level is not above the usage threshold, the device is instructed to wait for a charging interval (step 2120) before returning to the determination of whether there is an external power source available (step 2040). In this embodiment, the device powers itself from power drawn from the external power source despite having a battery. However, if the charge level is above the usage threshold, the device is instructed to use the device's battery as a power source for a charging interval (step 2110), even if the device is connected to an external power source other than the battery, before returning to the determination of whether there is an external power source available (step 2040). In this manner, the device switches between drawing power from a battery and an external power source depending on its charge level.

Figure 3:
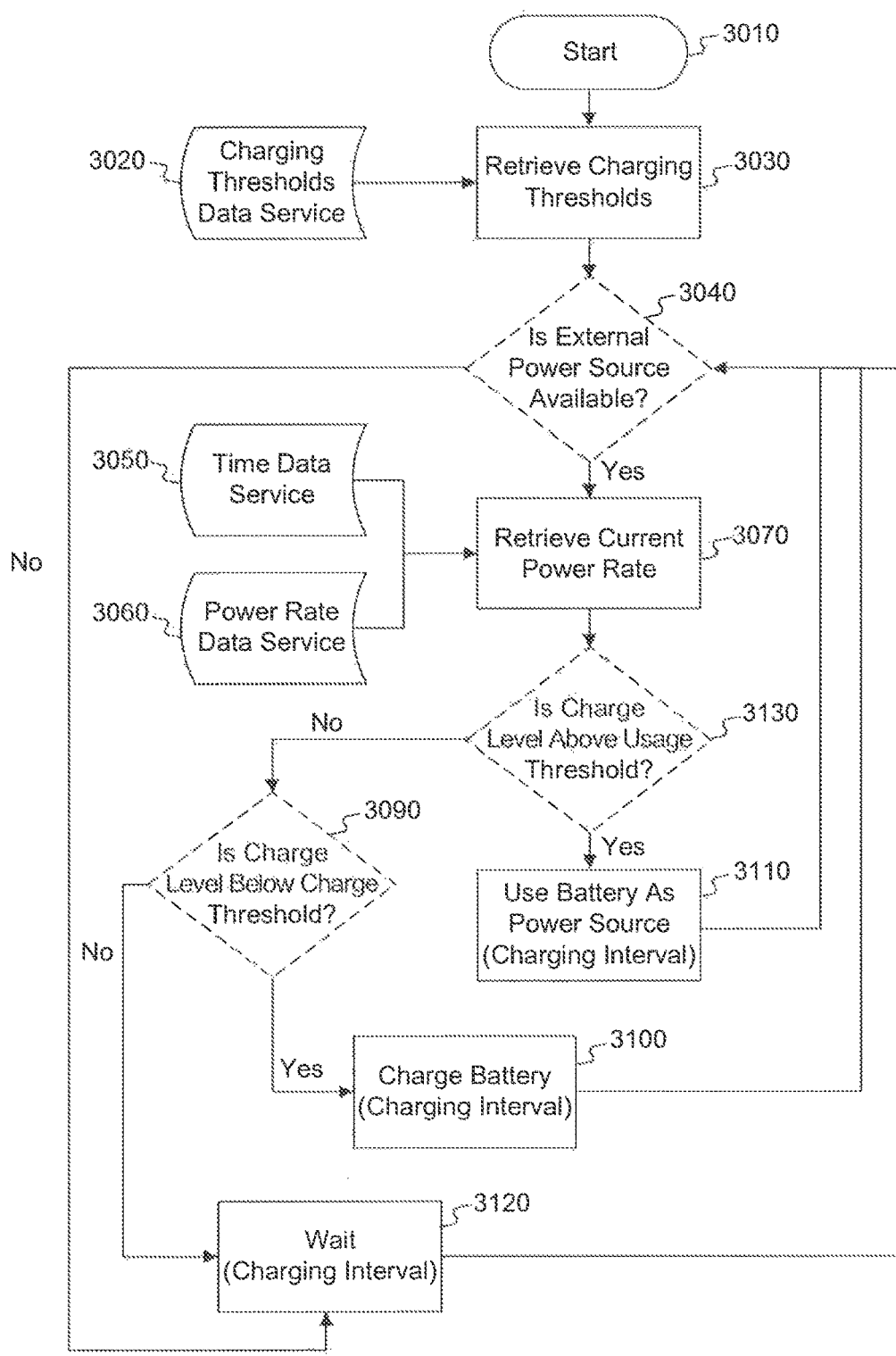
FIG. 3 is a flow chart of a battery charging and power source switching method according to one embodiment.

FIG. 3 depicts a method of performing both battery charging and power source switching for a device according to power rate. The method begins by retrieving charging thresholds (e.g., usage and charge thresholds) from a charging thresholds data service 3020 (step 3030) in substantially the same manner as described above with reference to FIG. 1. After retrieving the charging thresholds, a determination is made as to whether an external power source is available (step 3040). If no external power source is available, the device is instructed to wait for a charging interval (step 3120) before returning to the determination of whether there is an external power source available (step 3040).

If an external power source is available, a retrieval operation is performed to retrieve the current power rate (step 3070). In order to retrieve the current power rate, at least one of a time data service 3050 and a power rate data service 3060 is accessed. The time data service 3050 provides the current time. The power rate data service 3060 provides information on the power rates and when each power rate is in effect. For instance, during periods of high power usage or high power costs of the external power source, the power rate data service 3060 would indicate a high power rate (corresponding to a low charging threshold). In contrast, during periods of low power usage or low power costs of the external power source, the power rate data service 3060 would indicate a low power rate (corresponding to a high charging threshold).

Once the current power rate is retrieved, a determination is made as to whether the charge level of the device is above the usage threshold (step 3130). If the charge level is above the usage threshold, the device is instructed to use the device's battery as a power source for a charging interval (step 3110) before returning to the determination of whether there is an external power source available (step 3040). The device does not draw power from the external power source at during this interval in some embodiments.

If the charge level is not above the usage threshold, a determination is made as to whether the charge level is below the charge threshold (step 3090). If the charge level of the battery is not below the charge threshold, the device is instructed to wait for a charging interval (step 3120) before returning to the determination of whether there is an external power source available (step 3040). In this aspect, for example, the device draws power from the external power source but does not charge the battery with this power. In some embodiments, if the charge level of the battery is below the charge threshold the battery is charged for a charging interval (step 3100) using power from the external power source before returning to the determination of whether there is an external power source available (step 3040).

Figure 7:
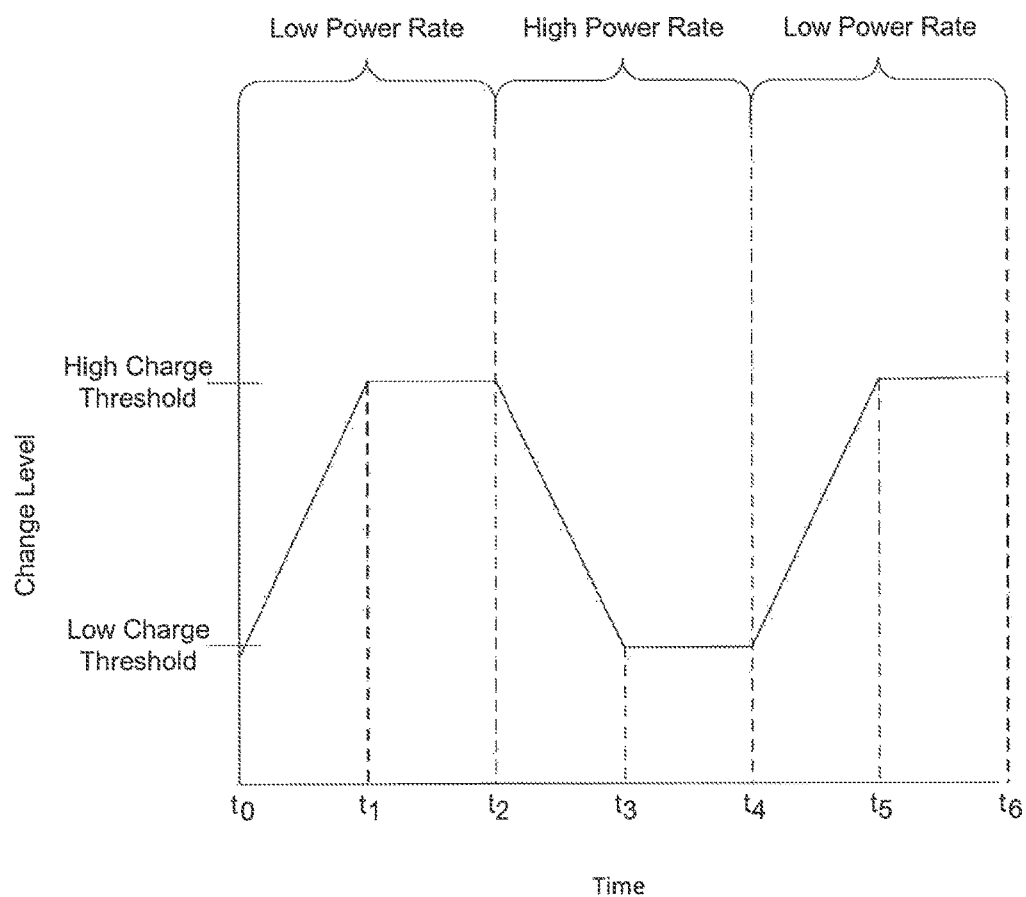
FIG. 7 is a chart that provides an example of the correspondence between two power rates and charge level over time.

FIG. 7 depicts a chart that provides an example of the correspondence between two power rates and charge level for a device over time in accordance with one aspect of the disclosed embodiments. Between time $t_0$ and $t_1$, a low power rate is in effect while the device's battery has a charge level below the corresponding high charging threshold (e.g., a charge threshold for a low power rate). Thus, between time $t_0$ and $t_1$, the device's battery will charge.

At time $t_1$, the low power rate remains in effect, but the device's battery has reached the high charging threshold. Thus, the battery's charge level will remain at approximately the high charging threshold until the low power rate ends at time $t_2$. While FIG. 7 depicts a horizontal line between time $t_1$ and $t_2$, it will be appreciated that in some embodiments the charge level would alternate between rising and falling for a charge interval, indicative of the battery alternating between going above and below the high charging threshold.

Between time $t_2$ and $t_3$, a high power rate is in effect while the battery has a charge level above the corresponding low charge threshold (e.g., a charge or usage threshold for the high power rate). Thus, between time $t_2$ and $t_3$, the device's battery will power the device and not be charged. However, at time $t_3$, while the high power rate remains in effect, the battery's charge level reaches the low charging threshold. Thus, the battery's charge level will remain at approximately the low charging threshold until the high power rate ends at time $t_4$.

At time $t_4$, the low power rate goes back into effect, and thus the battery is charged until it reaches the high charging threshold at time $t_5$.

Figure 8:
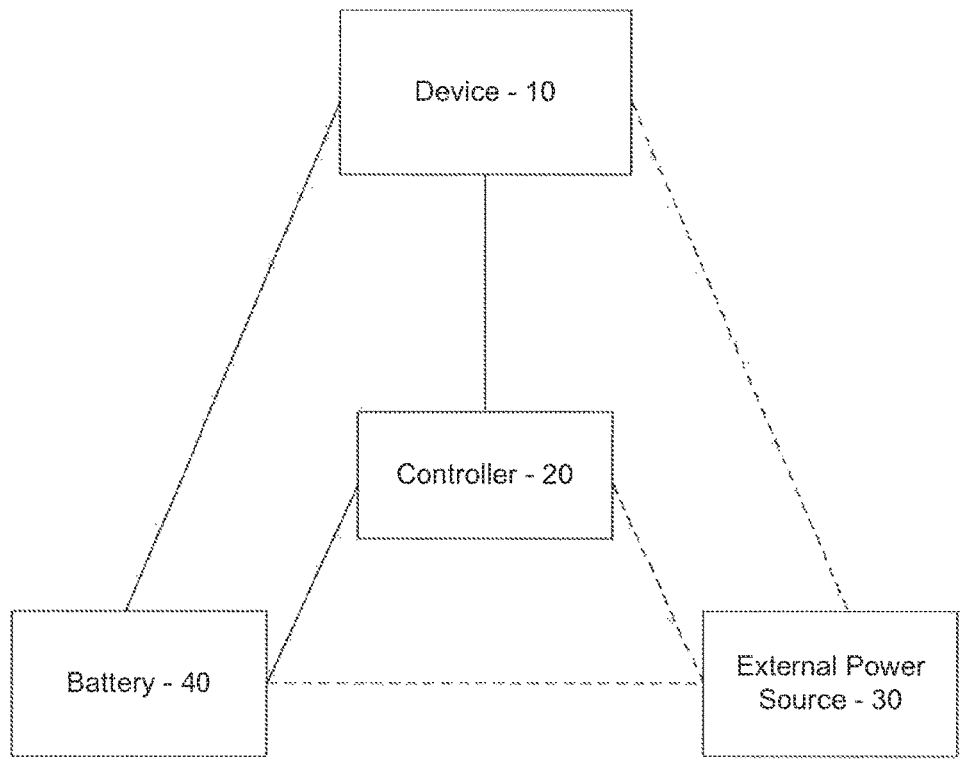
FIG. 8 provides an illustration of a system in which battery charging and power-source switching may be implemented.

FIG. 8 depicts a system in which battery charging and power-source switching may be implemented. As can be seen in FIG. 8, a controller 20 is connected to both a device 10 and a rechargeable battery 40. Further, as indicated by the dashed lines, an external power source 30 may also be connected to the controller 20.

Examples of the device 10 are a laptop computer, a tablet computer, a UPS, a computer that is attached to a UPS, and a cellular phone. However, other devices that include a rechargeable battery are also considered as being within the scope of the invention. The battery 40 may be either internal or external. The battery may be any rechargeable power source, such as a nickel metal hydride battery, a nickel cadmium battery, a lithium ion battery, a lithium polymer battery, or a fuel cell. The battery 40 could also comprise one or more different types of batteries. However, various other types of rechargeable batteries are also within the scope of the invention. The external power source 30 can be any power source that is not the battery 40 (the external power source 30 could be the same type as battery 40, so long as it is a separate power source). Examples of external power source 30 include a power grid, a power plant, an electrical generator, a turbine, a battery, or a solar panel. However, various other types of external power sources are also within the scope of the invention. The controller 20 can be a microprocessor or any circuit capable of electrically coupling the battery, external power source, and device for operation, including regulating the charge of the battery and drawing current from the external power source for charging the battery independent of providing power to the device for operation.

Device 10 may be configured to interface with, communicate with, and/or receive instructions from an external information service and/or an associated computing system to perform operations consistent with the disclosed embodiments. In some embodiments, an external information service includes a computing system associated with an external entity, such as an external business entity, government agency, educational institution, another user, a power company such as one associated with power source 30, another service entity (e.g., a charging threshold, time, and/or power rate data service), etc.

Figure 9:
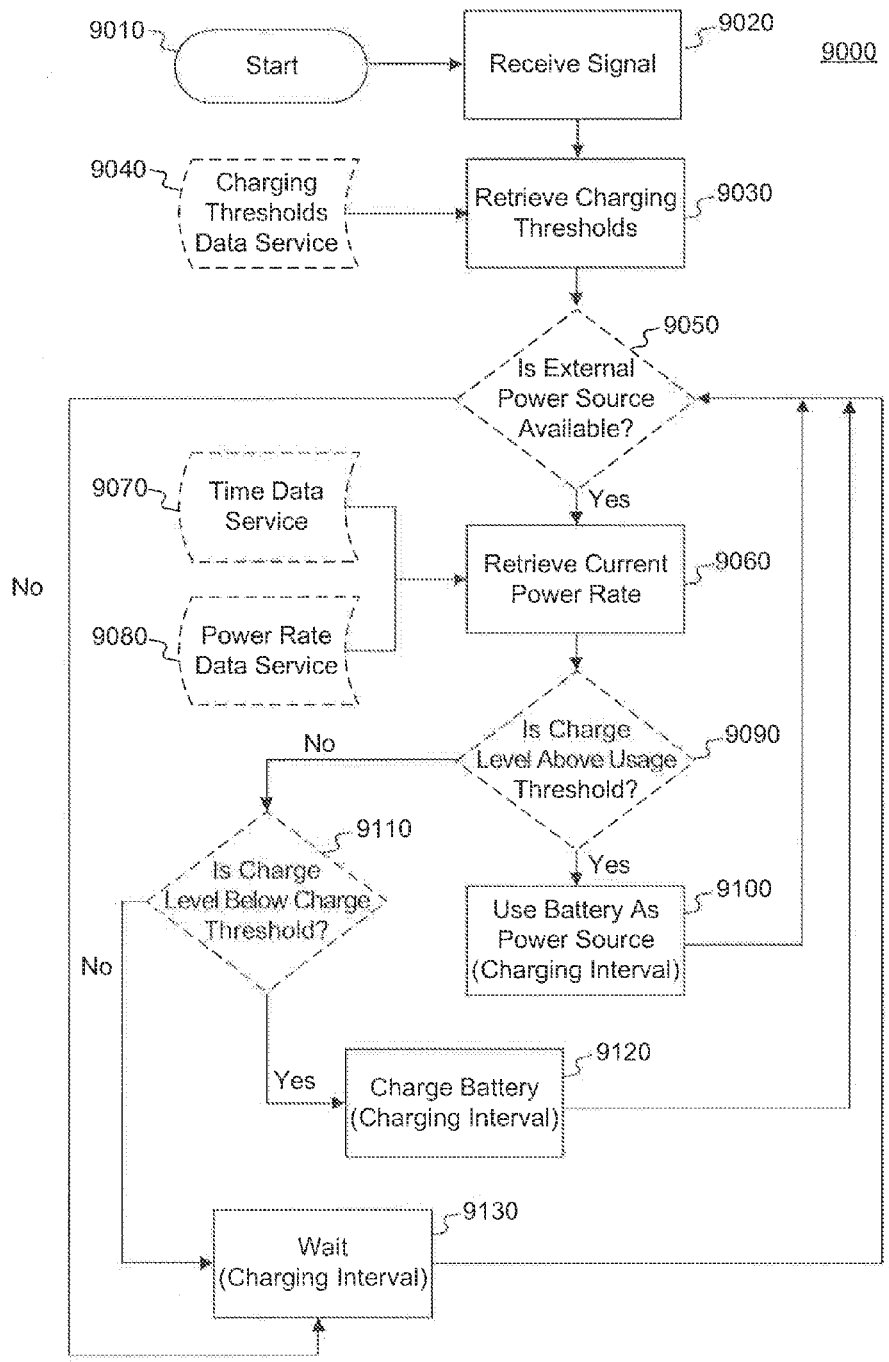
FIG. 9 depicts a flowchart of a battery charging and power source switching method originating from a power source signal according to one embodiment.

FIG. 9 depicts an example method 9000 for performing both battery charging and power source switching for device 10 based on an instruction from an external information service. The method 9000 begins (step 9010) by receiving a signal from a system associated with an external information service (step 9020). In certain aspects, the signal includes an instruction to initiate processing consistent with the disclosed embodiments. For example, the received signal may include an instruction for device 10 to initiate processes disclosed in connection with FIGS. 1, 2, 3, 9, and/or 10, etc. In the illustrative example of FIG. 9, for instance, the received signal may include an instruction for the device 10 to initiate processes consistent with battery charging and power source switching as described above. Device 10 may, in some embodiments, conduct these processes directly in response to the received signal. The signal may be transmitted over any network consistent with the disclosed embodiments. A computing system associated with the external information service may broadcast the signal to all devices, a set of devices within a certain device class (e.g., computers, refrigerators, etc.), a set of devices within a certain geographic location, a set of devices having a particular power usage profile, and/or a specific device 10 based on parameters consistent with the disclosed embodiments (e.g., a charging interval associated with the device).

In certain aspects, the signal sent from an external information service (e.g., power source 30) may include any of the information disclosed herein such as charging thresholds (e.g., charge and usage thresholds), time data, charging intervals, wait times, and/or power rate data, etc. For example, the signal may include a set of charging and usage thresholds for a set of power rates (e.g., as disclosed in connection with FIGS. 4-6). In such an embodiment, the signal may include a set of control pairs comprising a power rate and associated charging threshold(s) (e.g., a usage and/or a charge threshold). In another example, the signal may include power rate data, such as a current or expected power rate reflecting a value at which power purchasable from the external power source at a particular time. This data may come in the form of a single power rate or a set of power rates including, for example, expected future rates, power rates partitioned by device class, power rates based on user information such as user habits and preferences, etc. The charging thresholds, their corresponding power rates, the power rate data, etc. may be established, defined determined, or generated by a system associated with the external information service, a user associated with device 10, some other entity, or any combination thereof. The set of charging thresholds, power rates, etc. may be used for conducting processes consistent with the disclosed embodiments.

In some embodiments, the received signal may constitute, override, or be combined with other data retrieved through the disclosed data services. For example, in one aspect, device 10 may use charging threshold data included in the signal to serve as the charging thresholds obtained from a charging threshold data service 9040 (step 9030). In this example, an external information service or an associated system may constitute the charging threshold data service itself. In a similar fashion, the signal may also constitute data provided by time data service 9070 and/or power rate data service 9080. In another aspect, the received signal may override existing charging threshold data, time data, and/or power rate data used in the disclosed processes. For example, the signal sent by the external information service may include power rate data overriding previously stored power rate data used by device 10. The signal may override other types of data consistent with the disclosed processes. In one example, the signal may induce device 10 to check the charge level of a battery regardless of the current state of the charging interval (e.g., device 10 checks the charge level, power rate data, etc., in response to the signal received from the external information service).

In some aspects, data included in the signal may be combined with existing data stored on device 10 to generate new charging thresholds, time data, charging intervals, and/or power rate data, etc. By way of example, device 10 may be generate new power rate data by averaging or extrapolating stored power rate data with power rate data included in a received signal from an external information service. In another aspect, device 10 may be generate new data by combining stored and received data based on the most significant requirements, least significant requirements, most cost-efficient requirements, etc. In one illustrative embodiment, method 9000 may use the received signal to set the charging thresholds to the lowest or highest battery-power threshold for each given power rate. For example, if device 10 currently associates a low power rate with a charging threshold of 80% and a high power rate with a charging threshold of 40%, and the received signal associates these rates with thresholds of 70% and 50%, respectively, method 9000 may minimize the power drawn from power source 30 by associating the low and high power rates with charging thresholds of 70% and 40%, respectively. Other such combinations are possible, and the foregoing examples are for illustrative purposes only. For example, device 10 could alternatively determine when two sets of data conflict (or items included therein), and give preference to data received from the external information service, previously stored data on device 10, and so on.

A signal received from an external information service or an associated computing system may include an instruction for device 10 to perform actions consistent with the disclosed embodiments. In some aspects, the signal may include an instruction for device 10 to charge or draw power from battery 40, regardless of the current power rate or battery charge level. In another example, device 10 may check the charge level of a battery in response to receiving the signal (e.g., which itself may contain power rate data, etc.), may obtain power rate or charging thresholds from appropriate remote service systems, and so on. In one aspect, for instance, an external information service may transmit a signal to device 10 that includes power rate data. In this example, device 10 may obtain charging thresholds for the given power rate using processes described herein in response to receiving the signal and conduct processes to switch power sources or charge a battery, etc.

Additionally or alternatively, the signal may include an instruction altering a state, parameter, or setting of device 10. For example, the signal received from an external information service may instruct device 10 to enter a "sleep mode" immediately or in a predetermined amount of time to conserve battery usage. In other examples, the signal may shut down, power up, enable or disable energy-related features on, and/or affect the power consumption profile of device 10 (e.g., increase or decrease display speed, white balance, brightness, etc.; enable or disable power to certain ports, devices, or auxiliaries, etc.) immediately or at a future point in time. In this manner, the external information service or an associated computing system may partially or fully control the operability or energy-consumption profile of device 10 with a transmitted signal. In some embodiments, device 10 may perform these processes in response to receiving the signal from the external information service. Device 10 may make these determinations based on any parameters described herein, such as user preferences. For example, a user may establish a preference for device 10 to sleep in response to receiving a sleep signal from an external data service, do so when its battery charge level is above or below a certain threshold, etc. Device 10 may alter other parameters or settings in a similar manner.

In some aspects, device 10 may retrieve charging thresholds from a charging thresholds data service 9040 upon receiving a signal from an external information service (step 9030). As discussed above, the received signal may itself include the charging data thresholds. In some aspects, device 10 may store, determine, or generate the charging thresholds consistent with the disclosed embodiments (e.g., based on a received signal, user-defined thresholds, etc.).

Method 9000 may also determine or store information reflecting whether an external power source (e.g., power source 30) is available to power the device after receiving the signal from power source 30 (step 9050). If no external power source is available, then device 10 may wait for a period of time (e.g., a charging interval, some different duration of time, a user preference, etc.) before returning to the determination of whether the power source is available (steps 9130 and 9050). In some aspects, the signal received from an external information service may include information associated with a wait time or charging interval. In certain embodiments, the wait time (or charging interval, etc.) may be based on any of the information consistent with the disclosed embodiments (e.g., power rate data, charging thresholds, battery charge levels, user-defined wait times, user habits, etc.)

If a power source is available to device 10, the device may retrieve the current power rate (step 9060). Device 10 may obtain the current power rate via time data service 9070, power rate data service 9080, and/or electricity prices data service (not shown) through processes disclosed in connection with FIGS. 1-3. Additionally or alternatively, the signal received from the external information service may include the current power rate, which may constitute, override, or be combined with previously stored power rates (if any) as disclosed above.

After retrieving, determining, or generating the current power rate, device 10 may determine whether a battery 40 associated with device 10 (e.g., powering device 10 when no external power source is available as an alternative) has a charge level above a first charging threshold, such as a usage threshold (step 9090). This charging threshold, or any other charging threshold described herein, may be defined or determined through any process consistent with the disclosed embodiments. For example, the charging threshold may correspond to a particular usage threshold associated with a level of the current power rate.

If the charge level of the battery 40 exceeds the usage threshold, the device 10 may use the battery 40 as a power source for a predetermined period of time (e.g., a charging interval, some other duration specified in the received signal, a user preference, etc.) (step 9100). In some embodiments, using the battery 40 as a power source may alternatively or additionally include turning off or powering down device 10. When the predefined time period expires, the device may return to the determination of whether an external power source is available to the device (step 9050). In some aspects, device 10 may also wait until it detects an event, such as a connection event indicating that the device has been connected to an external power source 30. This event detection may supersede (e.g., override), extend, or take the place of the predefined wait time. In these aspects, connecting device 10 to an external power source 30 may generate a signal, detectable by the device, signifying the occurrence of the connection event. Other types of events are possible, such as a charge event reflecting whether a battery charge level has reached a threshold, a power rate event reflecting whether power rate data has reached a certain threshold, a location event reflecting whether the device has entered or left a certain geographic area, a power event reflecting whether the device has been powered on or off, or any other event consistent with the disclosed embodiments. In certain aspects, a user of device 10 may specify the event(s) recognized by the device.

In some embodiments, when the charge level of the battery 40 is not above the usage threshold, device 10 may determine whether the charge level is below a second charging threshold, such as a charge threshold (step 9110). Like the first charging threshold, the second charging threshold may be based on information consistent with the disclosed embodiments, such as power rates, information received from a signal, user information such as user preferences or schedule information, habits, other charging thresholds, or any other information described herein. This charge threshold may be equal to or different from (e.g., less than) the first charging threshold associated with step 9090. If the charge level of battery 40 is below the charge threshold, then device 10 may be instructed to charge battery 40 for a period of time (e.g., a charging interval, some other period of time, a user preference, a time defined in the received signal, etc.) (step 9120). If the charge level of battery 40 is not below the charge threshold, the device 10 may wait for a period of time (e.g., a charging interval) as disclosed above in step 9130 before returning to the determination of whether an external power source 30 is available to device 10 (step 9050) or whether an event has occurred. In this embodiment, device 10 may power itself with power from an external power source 30, but will not charge battery 40 during this period. This enables device 10 preserve battery power while reducing power consumed from the grid.

While certain steps in connection with process 9000 have been discussed as occurring in a particular order or on a particular device, those steps may be executed on any system consistent with the disclosed embodiments (e.g., device 10, a system associated with an external information service, etc.), or in any combination thereof. Moreover, the steps disclosed in connection with FIG. 9 may be optional, rearranged, or reordered. For example, process 9000 may determine whether an external power source 30 is available to device 10 before retrieving charging thresholds, process 9000 may retrieve the current power rate before determining whether an external power source is available, and the like.

By way of extended example illustrating one aspect of the foregoing embodiments, device 10 may store an association between three potential power rates (e.g., low, medium, and high) with a respective potential charging threshold or thresholds (e.g., a usage threshold and a charge threshold). For example, device 10 may associate low power rates, medium power rates, and high power rates with usage thresholds of 90%, 70%, and 40%, respectively, and charge thresholds of 60%, 50%, and 20%, respectively. The set of potential power rates, their values, their corresponding potential charging threshold(s), etc., may be established by any process consistent with the disclosed embodiments (e.g., user preferences, signals received from an external information service, device classes and characteristics, current charge levels, etc.). Device 10 may then receive a signal from an external information service indicating that the current power rate is medium, that the power rate will be medium at a future time, etc. In response, device 10 may determine that the operative charging thresholds are 70% and 50% by matching the received power rate with corresponding potential power rate in the set of potential power rates. Device 10 may also determine the operative charging thresholds by, for example, determining whether the received power rate data lies within certain ranges in the set potential power rates (e.g., the potential power rates set forth a set of prices, and the received rate corresponds to a price between two set prices), etc. Device 10 may then determine a charge level associated with its battery and determine whether to draw power from the battery (e.g., the charge level exceeds and/or is equal to 70%), charge the battery with external power (e.g., the charge level is less than and/or equal to 50%), or draw power from the external power source without charging the battery (e.g., the charge level is between 50% and 70%). Device 10 may conduct this operation for a given amount of time, such as a charging interval, and then return to conduct further processes consistent with the disclosed embodiments. For example, device 10 may determine whether an external power source is available, update charging intervals or wait times, prompt an external information service for a signal, schedule an event to occur (e.g., as described in connection with FIG. 10), alter a device setting (e.g., a display brightness), update charging thresholds, or any other processes described herein.

Figure 10:
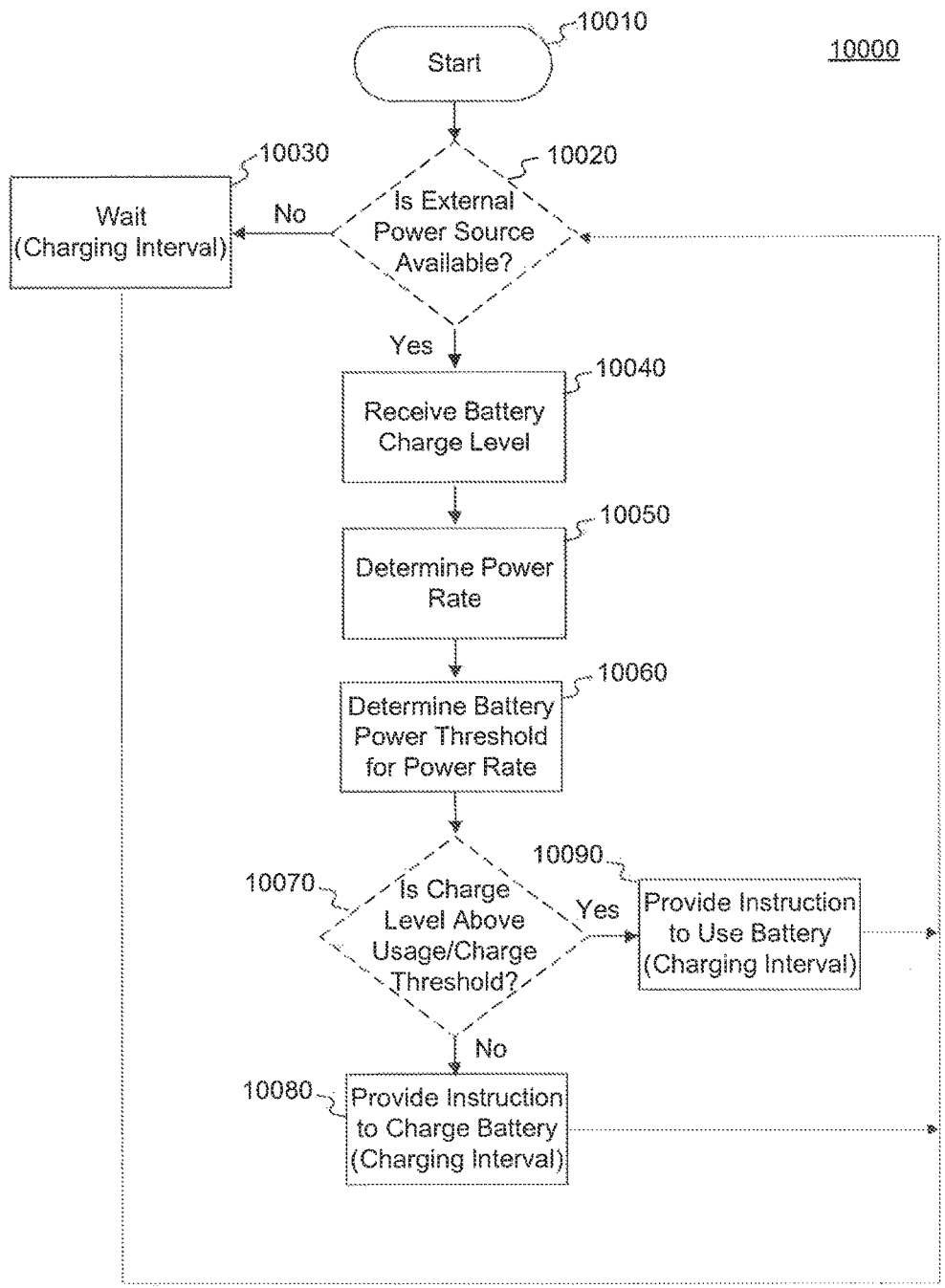
FIG. 10 depicts a flowchart for generating a power source instruction according to one embodiment.

FIG. 10 depicts a method 10000 for a generating a power source instruction signal according to one embodiment. In some aspects, the steps of method 10000 may be performed by an external information service, an associated computing system, device 10, or some combination thereof. Moreover, the steps of method 10000 may be optional, rearranged, or reordered consistent with the disclosed embodiments.

Method 10000 begins (step 10010) by determining or storing whether an external power source 30 is available to device 10 (e.g., whether device 10 is capable of drawing power from a power grid, a secondary battery, a generator, etc.) (step 10020). If no external power source is available, then device 10 may wait for a period of time (e.g., a charging interval, some different duration of time, a user preference, etc.) before returning to the determination of whether the power source is available or whether an event has occurred (step 10030). If no power source is available, device 10 may draw power from the battery (e.g., as no other power source is available), may put itself into sleep mode (e.g., depending on its current charge level), reduce its power consumption (e.g., reducing display brightness), etc., as described herein.

When an external power source 30 is available to device 10, method 10000 may include receiving, retrieving, prompting for, obtaining, or determining a charge level associated with battery 40 of the device using processes consistent with the disclosed embodiments (step 10040). For example, method 10000 may include determining that the charge level of battery 40 is currently 75% of total capacity.

In certain aspects, method 10000 may also include receiving, retrieving, prompting for, obtaining, or determining the current power rate (step 10050). Method 10000 may determine the power rate by any process consistent with the disclosed embodiments. For example, method 10000 may determine the current power rate by retrieving the power rate from a power rate data service (e.g., as disclosed in connection with FIGS. 1-3 and 9). In some embodiments, a computing system associated with an external information service may have access to stored or generated power rate data, and may provide this information to device 10.

Method 10000 may include retrieving, obtaining, generating, or determining one or more charging thresholds, each corresponding to a respective power rate. Method 10000 may determine the charging thresholds through any process consistent with the disclosed embodiments. For example, method 10000 may retrieve the charging thresholds from a charging thresholds data service (e.g., as discussed in connection with FIGS. 1-3 and 9). In another example, an external information service, an associated system, or device 10 may set, establish, or generate the charging thresholds consistent with the disclosed embodiments. In some aspects, method 10000 may use the charging thresholds and their respective power rates to determine a particular battery power threshold of battery 40 corresponding to the current power rate (step 10060). For example, if the determined charging thresholds define a charging threshold of 80% for a "low" power rate and a charging threshold of 50% for a "high" power rate, and the current power rate is determined to be "high," method 10000 may determine that the relevant charging threshold is 50%. Other charge and usage thresholds may be determined in this fashion.

Method 10000 may compare the charge level associated with battery 40 of device 10 with a determined charging threshold (step 10070). In the above example, method 10000 may compare the charge level of the battery 40 to a charging threshold of 50%. When the charge level of the battery is not above the charging threshold, method 10000 may include providing an instruction to device 10 to charge the battery from power provided through external power source 30 for a predetermined amount of time (step 10080). For example, an external information service or an associated system may send a signal to device 10 to charge its battery for a period of time equal to a charging interval or some other duration of time consistent with the disclosed embodiments (e.g., as defined in the provided signal). When the duration of time expires, method 10000 may return to determining whether a power source is available (step 10020) or any other step described in connection with FIG. 10.

When the charge level of the battery exceeds the charging threshold (or is above a second charging threshold as described above), method 10000 may include transmitting or providing an instruction to device 10 to draw power from the battery for a predetermined amount of time (e.g., a charging interval) (step 10090). For example, an external information service or an associated system may send an instruction over a network (e.g., via a signal) to device 10 to draw battery power for an amount of time equal to a charging interval. When the interval expires, method 10000 may return to determining whether a power source is available (step 10020) or any other step described in connection with FIG. 10. Method 10000 may also include implementing similar procedures for in the presence charge and usage thresholds (e.g., drawing power from a battery, drawing power from an external power source 30 but not charging the battery, and charging the battery with the external power source), as described in connection with FIG. 9.

In some embodiments, device 10, an external information service, or an associated computing system may schedule a time to perform operations consistent with the disclosed embodiments. For example, a system may schedule a time to send a signal to device 10, request a signal from the external information service, include information in the signal, determine whether device 10 is connected to power source 30, alter a state of device 10, or any other process described herein (e.g., processes described in connection with FIGS. 1-10). This scheduling may reflect an independent process (e.g., independent from other predefined wait times or other steps) or may be incorporated into a preexisting routine (e.g., to initiate a process, to determine a charging interval or other wait time, as information included in a received signal, etc.). The scheduling may take place on device 10, the external information service, or an associated system. Device 10 and/or a system associated with the external information service may communicate information necessary to conduct such scheduling over a network.

In some aspects, the scheduling may be based on any of the information described in connection with the disclosed embodiments and/or any historical, expected, predicted, or current analysis thereof. In one embodiment, for example, the scheduling may account for a current power rate (e.g., based on current rates, current conditions, current outages, etc.), an expected or predicted power rate (e.g., the power rate expected or known to be in effect at a future time, incorporating known maintenance schedules, etc.), a historical power rate (e.g., a power rate historically in effect at a particular time, etc.), or any combination thereof. The expected or historical power rates may account for any number of factors such as time of day, day of the week, time of the year, user habit information, known external events (e.g., known power source maintenance intervals, power outages, other events such as the Superbowl, etc.), and the like. In this manner, device 10 or an external information service may schedule times to determine the charge level of battery 40 (or some other process) more or less often during times of high power rates, low power rates, when a calculated rate is above or below a threshold, and so on.

The scheduling may also reflect user habits as described above or any historical or expected value derived therefrom. For example, if a system determines a user is likely to consume more power on device 10 or connect the device to an external power source 30 at a particular time (e.g., time of day, day of week, etc.), the system may schedule a time to perform a process (e.g., sending or prompting for a signal, charging thresholds, etc.) more or less often during those times and/or adjust the power rate data accordingly. In one illustrative embodiment, device 10 or an external information service may compute longer wait times (e.g., charging intervals) during periods when the user is less active and/or shorter wait times when the user is more active. In some aspects, the scheduling may also reflect or incorporate other user-based information such as user-defined preferences (e.g., user-defined wait times, charging intervals, schedules, etc.) or user schedule information. In one embodiment, for example, a computing system may schedule for device 10 to retrieve or determine power rate data, charging thresholds, etc, before a scheduled meeting, before a user drives along a route (e.g., based on historical user habits), and the like.

Device 10 and/or an external information service may incorporate other information into the scheduling. In one embodiment, the scheduling may be based on predicted, expected, and/or current charge levels of battery 40. For example, a system may shorten the duration of a charging interval when the current battery power is low (e.g., below a certain threshold), when the battery power is predicted to fall below a certain threshold (e.g., given a current charge level, historical or expected user habits in the intervening time, known power consumptions rates of device 10, etc.), and the like. Similarly, the system may increase the duration of a charging interval, wait time, or other scheduled process when the current charge level of battery 40 is high.

In some aspects, the scheduling may be based on a device class of device 10. For example, the scheduling may adjust charging intervals, wait times, or other scheduled processes based on whether device 10 is a mobile phone, tablet, laptop computer, mobile device generally, refrigerator, freezer, sensor, television, handheld consumer device (e.g., a gaming console, remote-controlled toy, etc.), camera, vehicle, and so on. The device class of device 10 may also be incorporated into other processes consistent with the disclosed embodiments (e.g., generating charging thresholds, etc.). For example, waiting intervals for a device class associated with refrigerators, freezers, or any other kind of perishable food unit may be shorter (or employ higher charge thresholds, etc.) than those associated with a computer or mobile device.

The foregoing embodiments improve the functioning of device 10 and/or effect a technical improvement in the field of power resource management in the device or related systems. In some aspects, for instance, the disclosed embodiments enhance a device's power management by adaptively switching between battery charging and usage states based on any of the relevant factors disclosed herein. In certain embodiments, these processes may prevent a device from needlessly drawing power from an external power source, prevent a battery from depleting its power supply, optimize a device's power consumption based on costs associated with external power, and so on. In turn, these embodiments achieve other technical improvements by reducing a device's strain on an external power source 30 (e.g., a power grid), a battery 40, or other power source, thereby permitting more devices to operate on the system, permitting other devices to operate at higher power consumptions, and the like. The disclosed embodiments also allow multiple computing systems to influence and direct the factors adaptively changing the state of device 10 in real-time. In some aspects, the disclosed embodiments may thereby optimize a device's power consumption based on a device's requirements, user requirements, requirements on an external power supply, or other components disclosed herein.

The above described embodiments can be implemented using software, hardware, or a combination of hardware and software. The software may be stored on a computer readable medium, such as RAM, ROM, hard disk, CD-ROM, DVD, and flash drive. However, other storage mediums are also within the scope of the invention. The software stored on a computer readable medium may be executed by the controller 20 in order to implement the above described embodiments.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for charging a battery associated with a device, wherein the device is configured to draw power from either one of a battery or an external power source, the method comprising the following operations performed by one or more processors:

receiving a signal from an external information service, the signal including power rate data reflecting a value at which power is purchasable at a particular time;

determining a usage threshold that reflects a minimum battery level in which a device draws power from the battery and a charge threshold that reflects a maximum battery level to which the device charges the battery from power drawn from the external power source corresponding to the power rate data and a device class of the device; and enabling the device to draw power from the battery as a function of whether a charge level associated with the battery exceeds the usage threshold, and enabling the device to charge the battery with power drawn from the external power source as a function of whether the charge level is below the charge threshold and whether the external power source is available.

2. The method of claim 1, wherein the charge threshold is less than the usage threshold, and further comprising enabling the device to draw power from the external power source without charging the battery as a function of whether the charge level exceeds the charge threshold and is less than the usage threshold.

3. The method of claim 2, wherein the charge threshold or the usage threshold is based on a user preference setting.

4. The method of claim 2, wherein enabling the device to draw power from the battery or enabling the device to draw power from the external power source occurs for an amount of time equal to a charging interval, and wherein the charging interval is based on the power rate data and the charge level associated with the battery.

5. The method of claim 2, wherein the usage threshold or the charge threshold is based on a user habit reflecting an energy usage pattern associated with the device.

6. The method of claim 2, wherein the usage threshold or the charge threshold is based on calendar data associated with a user of the device.

7. The method of claim 1, further comprising storing an association between a set of potential power rates and a respective set of potential charging thresholds, and wherein determining the usage threshold and the charge threshold further comprises comparing the power rate data to the set of potential power rates and selecting the usage threshold and the charge threshold based on the comparison.

8. The method of claim 1, further comprising:
scheduling a future time to obtain future power rate data, the scheduling based on the charge level and user schedule information; and
obtaining the future power rate data in accordance with the scheduling.

9. A system for charging a battery associated with a device, wherein the device is configured to draw power from either one of a battery or an external power source, the system comprising:
one or more processors;
one or more memories;
instructions stored in at least one of the memories, which, when executed by at least one of the processors, causes the system to perform the operations of:
receiving a signal from an external information service, the signal including power rate data reflecting a value at which power is purchasable at a particular time;

determining a usage threshold that reflects a minimum battery level in which a device draws power from the battery and a charge threshold that reflects a maximum battery level to which the device charges the battery from power drawn from the external power source corresponding to the power rate data and a device class of the device; and enabling the device to draw power from the battery as a function of whether a charge level associated with the battery exceeds the usage threshold, and enabling the device to charge the battery with power drawn from the external power source as a function of whether the charge level is below the charge threshold and whether the external power source is available.

10. The system of claim 9, wherein the charge threshold is less than the usage threshold, and further comprising enabling the device to draw power from the external power source without charging the battery as a function of whether the charge level exceeds the charge threshold and is less than the usage threshold.

11. The system of claim 10, wherein the charge threshold or the usage threshold is based on a user preference setting.

12. The system of claim 10, wherein enabling the device to draw power from the battery or enabling the device to draw power from the external power source occurs for an amount of time equal to a charging interval, and wherein the charging interval is based on the power rate data and the charge level associated with the battery.

13. The system of claim 10, wherein the usage threshold or the charge threshold is based on at least one of:
a user habit reflecting an energy usage pattern associated with the device; or
user schedule information based on calendar data associated with a user of the device.

14. The system of claim 9, wherein the operations further comprise storing an association between a set of potential power rates and a respective set of potential charging thresholds, and wherein determining the usage threshold and the charge threshold further comprises comparing the power rate data to the set of potential power rates and selecting the usage threshold and the charge threshold based on the comparison.

15. The system of claim 9, wherein the operations further comprise:
scheduling a future time to obtain future power rate data, the scheduling based on the charge level and user schedule information; and
obtaining the future power rate data in accordance with the scheduling.

16. A tangible, non-transitory computer-readable medium storing instructions that, when executed by at least one processor, cause the at least one processor to perform a method for charging a battery associated with a device, wherein the device is configured to draw power from either one of a battery or an external power source, comprising:
receiving a signal from an external information service, the signal including power rate data reflecting a value at which power is purchasable at a particular time;

determining a usage threshold that reflects a minimum battery level in which a device draws power from the battery and a charge threshold that reflects a maximum battery level to which the device charges the battery from power drawn from the external power source corresponding to the power rate data and a device class of the device; and enabling the device to draw power from the battery as a function of whether a charge level associated with the battery exceeds the usage threshold, and enabling the device to charge the battery with power drawn from the external power source as a function of whether the charge level is below the charge threshold and whether the external power source is available.

17. The non-transitory computer-readable medium of claim 16, wherein the charge threshold is less than the usage threshold, and further comprising enabling the device to draw power from the external power source without charging the battery as a function of whether the charge level exceeds the charge threshold and is less than the usage threshold.

18. The non-transitory computer-readable medium of claim 17, wherein the charge threshold or the usage threshold is based on at least two of:

a user preference setting;
user habit reflecting an energy usage pattern associated with the device; and
calendar data associated with a user of the device.

19. The non-transitory computer-readable medium of claim 17, further comprising storing an association between a set of potential power rates and a respective set of potential charging thresholds, and wherein determining the usage threshold and the charge threshold further comprises comparing the power rate data to the set of potential power rates and selecting the usage threshold and the charge threshold based on the comparison.

20. The non-transitory computer-readable medium of claim 17, wherein enabling the device to draw power from the battery or enabling the device to draw power from the external power source occurs for an amount of time equal to a charging interval, and wherein the charging interval is based on the power rate data and the charge level associated with the battery.

* * * * *